United States Patent
Stemme

(10) Patent No.: US 10,812,631 B2
(45) Date of Patent: Oct. 20, 2020

(54) MEDIA CONVERTER

(71) Applicant: Phoenix Contact GmbH & Co. KG, Blomberg (DE)

(72) Inventor: Maik Stemme, Auetal (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 0 days.

(21) Appl. No.: 16/447,828

(22) Filed: Jun. 20, 2019

(65) Prior Publication Data

US 2019/0394306 A1 Dec. 26, 2019

(30) Foreign Application Priority Data

Jun. 21, 2018 (BE) .................................. 2018/5432

(51) Int. Cl.
*H04B 10/00* (2013.01)
*H04L 29/06* (2006.01)
(Continued)

(52) U.S. Cl.
CPC ....... *H04L 69/08* (2013.01); *H04B 10/25752* (2013.01); *H04J 3/0676* (2013.01)

(58) Field of Classification Search
CPC ............................ H04B 10/801; H04B 10/803
See application file for complete search history.

(56) References Cited

U.S. PATENT DOCUMENTS

2007/0010132 A1* 1/2007 Nelson ................. G02B 6/4201
439/577
2013/0266026 A1 10/2013 McCormack et al.
(Continued)

FOREIGN PATENT DOCUMENTS

| CN | 101950659 A | 1/2019 |
|----|-------------|--------|
| DE | 102016213076 A1 | 1/2018 |

(Continued)

OTHER PUBLICATIONS

Office Action issued in German patent application No. 102018114941.7, dated Feb. 2, 2019, 18 pp.
(Continued)

*Primary Examiner* — Daniel G Dobson
(74) *Attorney, Agent, or Firm* — Kaplan Breyer Schwarz, LLP

(57) ABSTRACT

A media converter for transmitting data of a wired data network, transmitter, receiver for a media converter of this type, and method for transmitting data of a wired data network, in which a data signal is received via a first medium in accordance with a first network protocol and is converted into a sequence of bits that represents transmitted data on the physical layer of a second protocol, which is based on a different energy form that is present after conversion. A wireless transmission signal in a predetermined frequency band that is subsequently modulated using the sequence of bits, can subsequently be emitted and received on the receiving side as a wireless transmission signal in the predetermined frequency band, which is thereupon demodulated into a sequence of bits that represents data on the physical layer of the second protocol. After conversion of the sequence of bits into a data signal in accordance with the first network protocol, the signal is outputted via the wired data network.

22 Claims, 1 Drawing Sheet

(51) Int. Cl.
    *H04B 10/2575*    (2013.01)
    *H04J 3/06*    (2006.01)
    *H04J 14/00*    (2006.01)

(56) References Cited

U.S. PATENT DOCUMENTS

| | | | |
|---|---|---|---|
| 2014/0273833 A1* | 9/2014 | McCormack | H04B 5/0037 455/41.1 |
| 2017/0046299 A1 | 2/2017 | Isaac et al. | |
| 2018/0019770 A1* | 1/2018 | Lange | H04B 1/0458 |

FOREIGN PATENT DOCUMENTS

| | | |
|---|---|---|
| EP | 2369353 A2 | 9/2011 |
| WO | 2014/150702 A1 | 9/2014 |

OTHER PUBLICATIONS

Written Opinion issued in Belgian patent application No. 2018/5432, dated Mar. 14, 2019, 18 pp.
Office Action issued in counterpart Chinese patent application No. 201680068440.8, dated Jan. 17, 2020, 14 pp.

* cited by examiner

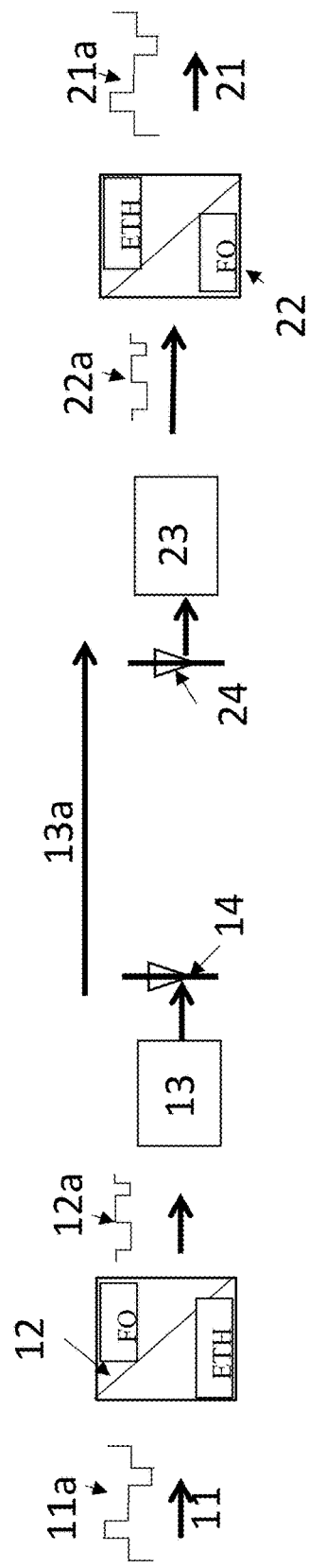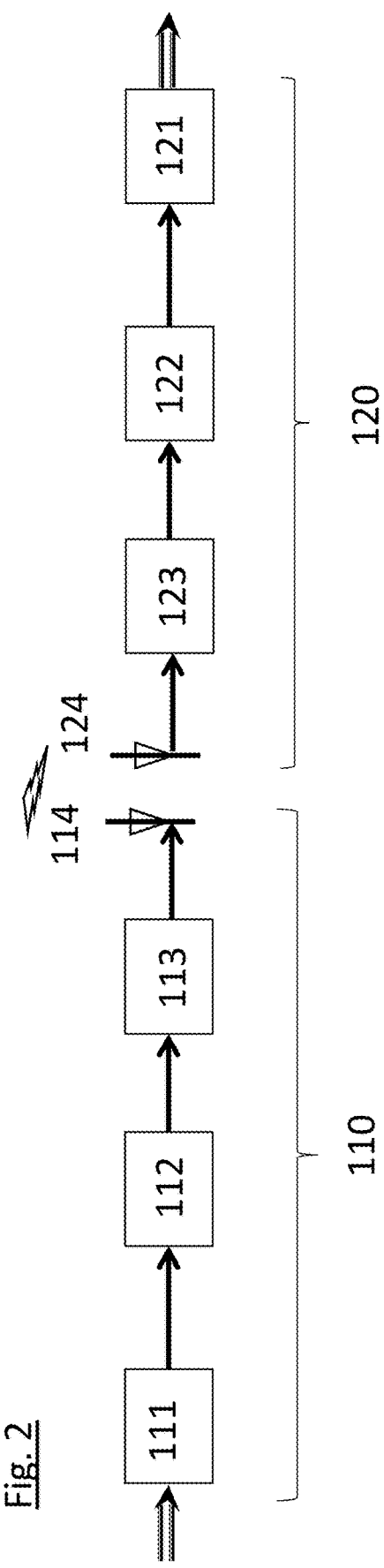

MEDIA CONVERTER

RELATED APPLICATION

This application claims the priority benefit of Belgium patent application number BE2018/5432, the entire disclosure of which is incorporated herein by reference.

FIELD

The invention relates to a media converter for transmitting data of a wired data network, to a transmitter and a receiver for a media converter of this type, and to a method for transmitting data of a wired data network.

BACKGROUND

In industrially conventional communication interfaces, 100 Mbit/s or 1 Gbit/s Ethernet communication is being used more and more frequently. For this purpose, in some cases protocols that enable real-time capability are used (for example EtherCat, Sercos, Profinet IRT, etc.). This means that they operate with very short latency times and are to some extent deterministic.

However, when protocols of this type are to be transmitted wirelessly, at present this fails because the packet-oriented transmission produces so much additional latency that these protocols no longer function. Looking at the processing times that occur in the transmission of data of a wired data network, in particular even in the case of an intermediate wireless transmission path, a basic problem in packet-oriented transmission is the wait for a complete packet between each transmission path. Wireless transmission is thus only possible to an inadequate extent, although at present in wireless communication many different wireless technologies are used. The best-known are Bluetooth and WLAN, but also Zigbee, Trusted Wireless, or else mobile telephony and many others.

These wireless technologies provide the option of communicating wirelessly, but are generally configured for specific applications. They vary in bandwidth or transmission data rate, range, modulation, etc. However, they all have in common the fact that they are based on packet-oriented communication. This means that a particular amount of information (for example a few bytes) initially has to be received first from the original source on the basis of an electrical copper interface. Subsequently, this packet is optionally further expanded with additional information (known as a header) before this information is passed to the corresponding wireless interface. In this context, the data are modulated and emitted via an antenna. On the receiver side, the information enters demodulation via the antenna. Subsequently, the data are freed of the added information and the data packet is outputted again on an electric copper interface.

From DE 10 2016 213 076 A1, a more developed technology for contactless data transmission with real-time requirements is known, in particular for data transmission in connection with industrial Ethernet protocols. Therein, a transmitter and a receiver for a contactless transmission coupler for bidirectional transmission of data of a wired data network and a contactless transmission coupler for bidirectional transmission of data of a wired data network comprising a combined transmission and reception device are provided.

Specifically, in this context DE 10 2016 213 076 A1 proposes a transmitter that has an input for receiving a data signal and a converter that is set up to convert the received data signal into a sequence of bits, the sequence of bits representing the physical layer of a network protocol used on the wired data network or representing the payload data transmitted on the physical layer of the network protocol used on this data network. A modulator subsequently modulates a transmission signal using the sequence of bits generated by the converter, and, by shifting the transmission signal into a high-frequency band, a high-frequency stage generates a high-frequency signal, which is subsequently emitted via an antenna and received again by a receiver via a further antenna. A high-frequency stage of the receiver subsequently in turn generates a transmission signal by shifting the high-frequency signal into an intermediate frequency band, from which a demodulator subsequently again generates by demodulation a sequence of bits, which represents the payload data transmitted on the physical layer of the network protocol used on the wired data network and which is converted into a data signal by a converter and subsequently outputted on the data network again.

Through this approach, DE 10 2016 213 076 A1 does in principle make it possible for data to be transmitted contactlessly and efficiently with an extremely short latency time of the same order of magnitude as the bit width, since the bit sequence transmitted on the physical layer of the wired data network is detected, a transmission signal is modulated using the detected bit series and transmitted as a wireless signal, and subsequently the wireless signal is demodulated again, the bit sequence is reconstructed, and a corresponding data signal for the wired data network is generated.

However, in this context, a drawback is that for mutual synchronization of the transmitter and receiver, a logic circuit, in particular in the manner of an FPGA (field programmable gate array), which is responsible for generating a clock cycle or control frequency, has to be provided both on the transmitter side and on the receiver side, in addition to the converter.

SUMMARY

An object of the invention is therefore to demonstrate a procedure that is substantially further improved over the prior art for transmitting data of a wired data network on a wireless intermediate transmission path, by way of which in particular additional clock cycle and/or control frequency generation for mutual synchronization of the transmitter and receiver by way of a separate module can be omitted.

The solution according to the invention is provided by the subject matters having the features according to the independent claims. Expedient embodiments or developments form the subject matter of the dependent claims.

The invention therefore proposes providing a transmitter for a media converter for transmitting data via different media, the transmitter having an input, a converter, a modulator and an antenna.

In this context, the input of the sensor is set up for receiving a data signal via a first medium formed as a wired data network in accordance with a first network protocol used on the first wired data network. The converter is set up to convert the received data signal into a sequence of bits, the sequence of bits representing transmitted data on the physical layer of a second protocol, which is based on a second medium that is present at the output side of the converter. The modulator is set up to modulate a wireless transmission signal in a predetermined frequency band using the sequence of bits supplied by the converter, and the antenna is provided to emit the wireless transmission signal.

The invention further proposes providing a receiver for a media converter for transmitting data via different media, comprising a first medium formed as a wired data network and a network protocol used for this, the receiver having an antenna, a demodulator, a converter and an output.

In this context, the antenna of the receiver is set up to receive a wireless transmission signal in a predetermined frequency band. The demodulator is set up to generate, by demodulating the wireless transmission signal, a sequence of bits that represents data on the physical layer of a second protocol, which is based on a second medium present at the input side of the converter, the converter being set up to convert the sequence of bits into a data signal in accordance with the first network protocol used on the wired data network, and the output is provided for outputting the data signal on the wired data network.

For transmitting data of a wired data network via different media, the invention further proposes forming a media converter with a transmitter and receiver as outlined above.

The invention finally also proposes a method for transmitting data of a wired data network via different media, comprising the following steps. Via a first medium, formed as a wired data network, a data signal (11a) is received in accordance with a first network protocol used on the wired data network and is converted into a sequence of bits, the sequence of bits representing transmitted data on the physical layer of a second protocol, which is based on a different energy form that is present after conversion, and subsequently a wireless transmission signal in a predetermined frequency band is modulated using the sequence of bits. This wireless transmission signal is emitted and received again. The received wireless transmission signal is in turn demodulated into a sequence of bits, which represents data on the physical layer of the second protocol, and subsequently the sequence of bits is converted into a data signal in accordance with the first network protocol used on the wired data network and is outputted via the wired data network.

Thus, by contrast with the prior art, in particular with DE 10 2016 213 076 A1, an aspect of the invention is that the sequence of bits that is converted on the transmitter side from a data signal received via a wired data network or the sequence of bits that is to be converted on the receiving side into a data signal to be outputted to a wired data network represents neither the physical layer of the network protocol used on the wired data network nor the payload data transmitted on the physical layer of the network protocol used on this wired data network.

Rather, the sequence of bits represents transmitted data on the physical layer of a further protocol, specifically the protocol based on the medium on the side of the converter at which the sequence of bits is present. As a result, an additional clock cycle and/or control frequency generation for mutual synchronization of the transmitter and receiver using a separate module can be omitted, since synchronization information, in particular synchronization information required for the receiver side, may already be embedded directly in the sequence of bits, and not only be generated during the modulation.

In this context, preferably the wired data network is based on an Ethernet standard, preferably on 100BASE-T or 1000BASE-T, and/or the second protocol corresponds to a fiber channel standard, for example 100BASE-FX or 1000BASE-FX. In particular in this case, an Ethernet PHY comprising a fiber optic interface is expediently further used as a converter.

It is preferably provided that an ISM band is used for the wireless transmission signal, in particular an EHF (extremely high-frequency) frequency range, preferably a frequency range of 57 to 66 GHz or above. On the one hand, this makes sufficient bandwidth possible and allows continuous communication. Also, in this frequency range, very small communication spaces are possible for a simultaneously high data rate, in such a way that many different systems or media converters according to the invention can operate in close proximity alongside one another without interference.

The converter expediently further undertakes coding during the conversion of bits, in particular 4B5B coding, on the basis of the physical layer present at the output-side interface of the converter in each case, since as a result an associated piece of synchronization information can be embedded in the converted data in a simple manner.

The conversion by the converter of the transmitter and/or the converter of the receiver preferably takes place virtually continuously and independently of frames or packets.

BRIEF DESCRIPTION OF THE DRAWINGS

Further features and advantages will be apparent from the following description of preferred embodiments and developments with reference to the accompanying drawings, in which:

FIG. 1 is a heavily simplified process diagram of a preferentially embodied method for transmitting data of a wired data network via different media according to the invention, and FIG. 2 is a heavily simplified block diagram of an embodiment of a media converter comprising a transmitter and a receiver according to the invention.

DETAILED DESCRIPTION

FIG. 1 is a heavily simplified block diagram showing transmission of data of a wired data network via different media. The method shown and the devices further additionally described hereinafter may be used for example in the context of communications interfaces for wireless energy and data coupling, for example in the automotive industry or another automation environment, to replace high-maintenance plug-in connectors, for example on interchangeable robot tools.

In this context, via a first medium formed as a wired data network, a data signal 11a corresponding to a first network protocol used on the wired data network is received, as is indicated by reference numeral 11, and subsequently the received data signal is converted into a sequence of bits 12a, as is indicated by reference numeral 12. After the conversion, the sequence of bits 12a represents data to be transmitted on the physical layer of a second protocol, specifically of one based on a different energy form that is present after the conversion. In practical implementation, the first data network may be in particular a wired, in particular copper-based data network, and/or the data signal 11a may therefore be in particular a field bus data signal, for example an Ethernet signal corresponding to the standard 100BASE-T or 1000BASE-T, which at present is frequently used in industry and/or in automation technology for packet-based communication. In the implementation, the data of the received data signal are expediently detected on the bit transmission layer ("physical layer"="PHY") similarly to DE 10 2016 213 076 A1 so as to convert a multi-value data signal, in other words two-value or higher, for example a field bus signal transmitted via at least one wire pair, into a two-value signal in the form of a simple bit flow. This conversion preferably takes place immediately, in other words when the data signal arrives, independently of frames or packets and thus continuously and at most with merely a minimal delay. As stated previously above, however, after the conversion the sequence of bits 12a represents data to be transmitted on the physical layer of a second protocol, which is based on the different energy form that is present after conversion. If for example an Ethernet signal received via a wired data network is detected on the bit transmission layer, as indicated for example by a functional block denoted ETH in the conversion step 12 in FIG. 1, and if after conversion the bit sequence 12a is present in an energy form for output at a fiber optic interface, as indicated for example by a functional block denoted FO in the conversion step 12 in FIG. 1, the sequence of bits 12a represents the data to be transmitted on the physical layer of a second protocol suitable for this, in other words for example following a fiber channel standard, for example 100BASE-FX or 1000BASE-FX. As a result, an additional clock cycle and/or control frequency generation for mutual synchronization of the transmitter and receiver by way of a separate module can be omitted, since synchronization information, in particular synchronization information required for the receiver side, can already be embedded directly in the sequence of bits and need not only be generated separately subsequently. Preferably, in the context of the invention, conversion using an additional 4B5B coding also serves this purpose for synchronization and later clock cycle recovery in the receiver.

Subsequently, using the sequence of bits, the modulation 13 of a wireless transmission signal 13a in a predetermined frequency band takes place. For this purpose, expediently a binary, direct modulation is carried out, the predetermined, expediently adjustable frequency band having to provide sufficient bandwidth so as to make continuous, substantially latency-free communication possible in the modulated but still merely two-value signal. In this context, wireless transmission signal in the EHF (extremely high-frequency) frequency range or above has been found to be successful. In addition or alternatively, the use of an ISM (industrial, scientific and medical) band, preferably in the frequency range of 57 to 66 GHz, has also been found to be expedient for the wireless transmission signal, since this can generally be used without any authorization. Although the wireless transmission paths to be bridged using the invention generally only have short distances, preferably in the range of approximately 10 cm, and among experts an HF range of this type for such small distances runs contrary to expert knowledge and is not considered to be of interest, the HF ranges set out above are suitable even for small distances in the present case, in particular because they provide sufficient bandwidth to be able to transmit the modulated signal in a substantially latency-free manner at a high data rate, and also many systems can be operated alongside one another without interference, since highly controllable signal propagation is possible and as a result the communication space, in other words the wireless propagation, can be constrained well.

Depending on the specific embodiment, different modulation technologies can be used for the modulation, digital amplitude modulation having proved to be particularly expedient in this regard since it is also simple to demodulate again. Alternatively, however, other modulation technologies can also be used, such as FSK (frequency shift keying) or PSK (phase shift keying).

The wireless transmission signal 13a that is emitted 14 after modulation and received 24 on the receiver side is subsequently demodulated into a sequence of bits 22a again, in other words in particular demodulated in a binary and direct manner, the sequence of bits 22a again representing data on the physical layer of the aforementioned second protocol. The recovered sequence of bits 22a is subsequently converted into a data signal 21a in accordance with the aforementioned first network protocol used on the wired data network and outputted 21 via the wired data network.

A media converter, which can also be used in particular for implementing the above-described method, for transmitting data via different media, in other words basically a transmission coupler that makes possible or even brings about an exchange of used transmission media during data transmission, thus as a matter of principle has a transmitter, denoted by reference numeral 110 in the heavily simplified block diagram in FIG. 2 of an embodiment of a media converter, and a receiver, denoted by reference numeral 120 in the heavily simplified block diagram in FIG. 2.

The transmitter 110 therefore further comprises an input 111, formed for receiving a data signal via a first medium formed as a wired data network in accordance with a first network protocol used on the first wired data network.

The transmitter 110 further comprises a converter 112 suitable for converting the received data signal into a sequence of bits. In practical implementation, the input 111 thus hands over the received data signal to a physical interface (PHY) at the input of the converter 112. If the wired data network is based on an Ethernet standard, preferably on 100BASE-T or 1000BASE-T, in this context the PHY of the converter 112 is formed as a correspondingly suitable Ethernet PHY.

Taking into account the above description, made with reference to FIG. 1, of method configurations according to the invention, the converter is further set up to convert the received data signal into a sequence of bits in such a way that the converted sequence of bits represents transmitted data on the physical layer of a second protocol, which is based on a second medium originally provided on the output side of the converter. In particular, if the converter 112 has preferably a fiber optic interface at the output side in accordance with the above description, the second protocol can therefore correspond to a fiber channel standard, for example 100BASE-FX or 1000BASE-FX.

The transmitter 110 further has a modulator 113 that is downstream from the converter 112 in terms of the transmission and that, using the sequence of bits supplied by the converter, modulates a wireless transmission signal in a predetermined frequency band, which is subsequently passed to an antenna 114 of the transmitter for emitting the wireless transmission signal.

A wireless transmission signal emitted by the antenna 114 of the transmitter can subsequently be received again by a receiver 120 of the media converter.

For this purpose, the receiver 120 sketched in FIG. 2 therefore initially has an antenna 124 for receiving the wireless transmission signal in a predetermined frequency band, a demodulator 123, a converter 122 that is downstream from the demodulator in terms of transmission, and an output 121.

Taking into account the above description, also made in particular with reference to FIG. 1, the demodulator 123 is correspondingly set up to generate again, by demodulation of the wireless transmission signal, a sequence of bits that subsequently represents data on the physical layer of the second protocol. Unlike the converter 112 of the transmitter 110, the converter 122 has at the input an originally provided medium corresponding to the applied second protocol, and is set up to convert the sequence of bits again into a data signal corresponding to the first network protocol used on the wired data network. The output 121 is subsequently responsible for outputting the data signal on the wired data network.

It should be noted that in the context of the invention a medium converter is as a matter of principle also provided with at least one combined transmission and receiving device, which comprises a transmitter and a receiver as described above, for bidirectional transmission of data of a wired data network.

It should further be noted that, for the above-described conversion of a field bus data signal, in particular an Ethernet data signal, into a sequence of bits in accordance with a fiber channel standard or vice versa, the converter 112 and/or the converter 122 may be implemented with a PHY that already has the other interface or else be implemented in terms of circuitry with two PHYs, in other words, in the case of conversion of an Ethernet data signal into a sequence of bits in accordance with a fiber channel standard or vice versa, with an Ethernet PHY that already has an additional fiber optic interface or else with two correspondingly required PHYs that are interconnected in terms of circuitry.

Taking into account the above description, also made in particular with reference to FIG. 1, the modulator 113, the antennae 114 and 124, and the demodulator 123 are expediently formed in such a way that the radio transmission signal is in the EHF (extremely high-frequency) range or above and/or is in an ISM band, in particular in an ISM band in the GHz range, preferably in the frequency range of 57 to 66 GHz. The aforementioned devices are also expediently set up in such a way that the predetermined frequency range can be adjusted.

Likewise taking into account the above description, also made in particular with reference to FIG. 1, the converter 112 and/or the converter 122 is expediently further set up on the one hand to undertake coding during the conversion of bits, in particular 4B5B coding, on the basis of the physical layer present at the output-side interface of the converter in each case, and/or on the other hand to carry out the conversion accordingly preferably continuously and independently of frames or packets.

Taking into account the above description, also made in particular with reference to FIG. 1, the converter formed for converting the data signal received from the wired data network into the sequence of bits is further preferably set up to embed synchronization information in the sequence of bits.

The invention claimed is:

1. A transmitter for a media converter for transmitting data via different media, comprising:
   an input for receiving a data signal via a first medium formed as a wired data network in accordance with a first network protocol used on the first wired data network;
   a converter that is set up to convert the received data signal into a sequence of bits, the sequence of bits representing transmitted data on the physical layer of a second protocol, which is based on a second medium present at the output of the converter;
   a modulator that is set up to modulate a wireless transmission signal in a predetermined frequency band using the sequence of bits supplied by the converter; and
   an antenna for emitting the wireless transmission signal;
   wherein the wired data network is based on an Ethernet Standard selected from the group consisting of 100BASE-T and 1000BASE-T; and
   wherein the second protocol corresponds to a fiber channel Standard selected from the group consisting of 100BASE-FX and 1000BASE-FX.

2. A receiver for a media converter for transmitting data via different media, comprising a first medium formed as a wired data network and a network protocol used for this, comprising:
   an antenna for receiving a wireless transmission signal in a predetermined frequency band;
   a demodulator and a converter that is downstream from the demodulator in terms of transmission,
   wherein the demodulator is set up to generate, by demodulating the wireless transmission signal, a sequence of bits that represents data on the physical layer of a second protocol, which is based on a second medium present at the input side of the converter, and
   the converter is set up to convert the sequence of bits into a data signal in accordance with the first network protocol used on the wired data network; and
   an output for outputting the data signal on the wired data network;
   wherein the wired data network is based on an Ethernet Standard selected from the group consisting of 100BASE-T and 1000BASE-T; and
   wherein the second protocol corresponds to a fiber channel Standard selected from the group consisting of 100BASE-FX and 1000BASE-FX.

3. A media converter for transmitting data of a wired data network via different media, comprising:
   a transmitter for a media converter for transmitting data via different media, comprising:
      an input for receiving a data signal via a first medium formed as a wired data network in accordance with a first network protocol used on the first wired data network;
      a converter that is set up to convert the received data signal into a sequence of bits, the sequence of bits representing transmitted data on the physical layer of a second protocol, which is based on a second medium present at the output of the converter;
      a modulator that is set up to modulate a wireless transmission signal in a predetermined frequency band using the sequence of bits supplied by the converter; and
      an antenna for emitting the wireless transmission signal;
   and
   a receiver according to claim 2.

4. A media converter for bidirectional transmission of data of a wired data network comprising a combined transmission and receiving device, the media converter comprising:
   a transmitter for a media converter for transmitting data via different media, comprising:
      an input for receiving a data signal via a first medium formed as a wired data network in accordance with a first network protocol used on the first wired data network;
      a converter that is set up to convert the received data signal into a sequence of bits, the sequence of bits representing transmitted data on the physical layer of a second protocol, which is based on a second medium present at the output of the converter;

a modulator that is set up to modulate a wireless transmission signal in a predetermined frequency band using the sequence of bits supplied by the converter; and an antenna for emitting the wireless transmission signal;

and a receiver according to claim 2.

5. The media converter according to claim 3, wherein the wireless transmission signal is in an ISM band.

6. The media converter according to claim 3, wherein the wireless transmission signal is in the EHF (extremely high-frequency) range or above.

7. The media converter according to claim 3, wherein the converter is at least an Ethernet PHY comprising a fiber optic interface.

8. The media converter according to claim 3, wherein the converter undertakes coding during the conversion of bits, in particular 4B5B coding, on the basis of the physical layer present at the output-side interface of the converter in each case.

9. The media converter according to claim 3, wherein the converter of the transmitter and/or the converter of the receiver is set up to carry out the conversion continuously and independently of frames or packets.

10. The media converter according to claim 3, wherein the converter formed for converting the data signal received from the wired data network into the sequence of bits is set up to embed synchronization information in the sequence of bits.

11. The media converter according to claim 4, wherein the wireless transmission signal is in an ISM band.

12. The media converter according to claim 4, wherein the wireless transmission signal is in the EHF (extremely high-frequency) range or above.

13. The media converter according to claim 4, wherein the converter is at least an Ethernet PHY comprising a fiber optic interface.

14. The media converter according to claim 4, wherein the converter undertakes coding during the conversion of bits, in particular 4B5B coding, on the basis of the physical layer present at the output-side interface of the converter in each case.

15. The media converter according to claim 4, wherein the converter of the transmitter and/or the converter of the receiver is set up to carry out the conversion continuously and independently of frames or packets.

16. The media converter according to claim 4, wherein the converter formed for converting the data signal received from the wired data network into the sequence of bits is set up to embed synchronization information in the sequence of bits.

17. The media converter according to claim 11, wherein the ISM band is in a GHz range.

18. The media converter according to claim 11, wherein the ISM band is in a frequency range of 57 GHz to 66 GHz.

19. The media converter according to claim 5, wherein the ISM band is in a GHz range.

20. The media converter according to claim 5, wherein the ISM band is in a frequency range of 57 GHz to 66 GHz.

21. A method for transmitting data of a wired data network via different media, comprising the following steps receiving a data signal via a first medium formed as a wired data network in accordance with a first network protocol used on the wired data network;

converting the received data signal into a sequence of bits, the sequence of bits representing transmitted data on the physical layer of a second protocol, which is based on a different energy form that is present after conversion;

modulating a wireless transmission signal in a predetermined frequency band using the sequence of bits and emitting the wireless transmission signal;

receiving the wireless transmission signal in the predetermined frequency band;

demodulating the radio transmission signal into a sequence of bits, which represents data on the physical layer of the second protocol;

converting the sequence of bits into a data signal in accordance with the first network protocol used on the wired data network and outputting the data signal via the wired data network;

wherein the wired data network is based on an Ethernet Standard selected from the group consisting of 100BASE-T and 1000BASE-T; and wherein the second protocol corresponds to a fiber channel Standard selected from the group consisting of 100BASE-FX and 1000BASE-FX.

22. A method for transmitting data of a wired data network via different media, comprising the following steps receiving a data signal via a first medium formed as a wired data network in accordance with a first network protocol used on the wired data network;

converting the received data signal into a sequence of bits, the sequence of bits representing transmitted data on the physical layer of a second protocol, which is based on a different energy form that is present after conversion;

modulating a wireless transmission signal in a predetermined frequency band using the sequence of bits and emitting the wireless transmission signal;

receiving the wireless transmission signal in the predetermined frequency band;

demodulating the radio transmission signal into a sequence of bits, which represents data on the physical layer of the second protocol;

converting the sequence of bits into a data signal in accordance with the first network protocol used on the wired data network and outputting the data signal via the wired data network.

* * * * *